(12) United States Patent
Nuissl et al.

(10) Patent No.: US 8,479,893 B2
(45) Date of Patent: Jul. 9, 2013

(54) ROLLING BEARING WITH BRAKE MECHANISM

(75) Inventors: Christian Nuissl, Fuerth (DE); Juergen Stoelzle, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 384 days.

(21) Appl. No.: 12/745,445

(22) PCT Filed: Oct. 22, 2008

(86) PCT No.: PCT/EP2008/064298
§ 371 (c)(1),
(2), (4) Date: Sep. 27, 2010

(87) PCT Pub. No.: WO2009/068375
PCT Pub. Date: Jun. 4, 2009

(65) Prior Publication Data
US 2011/0019953 A1 Jan. 27, 2011

(30) Foreign Application Priority Data
Nov. 30, 2007 (DE) .......................... 10 2007 057 780

(51) Int. Cl.
*B60T 13/04* (2006.01)
*F16C 33/34* (2006.01)

(52) U.S. Cl.
USPC .......................................... 188/171; 384/565

(58) Field of Classification Search
USPC ................... 188/158, 161, 163, 164, 171, 17, 188/25, 26; 384/548, 565, 572
See application file for complete search history.

(56) References Cited

U.S. PATENT DOCUMENTS

| 3,749,955 | A | * | 7/1973 | Fetzer | 310/93 |
| 5,232,072 | A | * | 8/1993 | Pluta | 188/72.7 |
| 6,568,854 | B2 | * | 5/2003 | Schleinitz | 384/448 |
| 2002/0153785 | A1 | | 10/2002 | Fukuyama et al. | |
| 2005/0135720 | A1 | * | 6/2005 | Ohno | 384/559 |
| 2010/0104234 | A1 | * | 4/2010 | Nuissl et al. | 384/572 |
| 2010/0150492 | A1 | * | 6/2010 | Nuissl et al. | 384/569 |
| 2012/0020602 | A1 | * | 1/2012 | Nuissl et al. | 384/446 |

FOREIGN PATENT DOCUMENTS

| DE | 19 04 954 | | 6/1970 |
| DE | 36 27 517 | | 4/1988 |
| DE | 37 25 972 | | 2/1989 |
| DE | 41 04 137 | | 8/1992 |
| DE | 43 06 803 | | 9/1994 |
| DE | 199 63 512 | | 2/2001 |
| DE | 101 27 487 | A | 12/2002 |
| EP | 0 222 312 | A | 5/1987 |

* cited by examiner

*Primary Examiner* — Thomas J Williams
(74) *Attorney, Agent, or Firm* — Lucas & Mercanti, LLP

(57) ABSTRACT

A rolling bearing with a brake mechanism, in particular a rotary connection, which has an outer bearing ring and an inner bearing ring, between which rolling bodies roll on assigned tracks. A brake element, which is connected displaceably to one of the bearing rings, is pressed against an opposite surface connected to the associated other bearing ring in order to produce a braking effect by frictional engagement and the frictional engagement can be cancelled by means of an electromagnet. The brake element is arranged as an integral bearing component inside one of the bearing rings and is pressed against the opposite surface by means of a spring force. The spring force is variably settable and the electromagnet includes one of the bearing rings as a soft-iron core and a coil enclosing the latter.

9 Claims, 2 Drawing Sheets

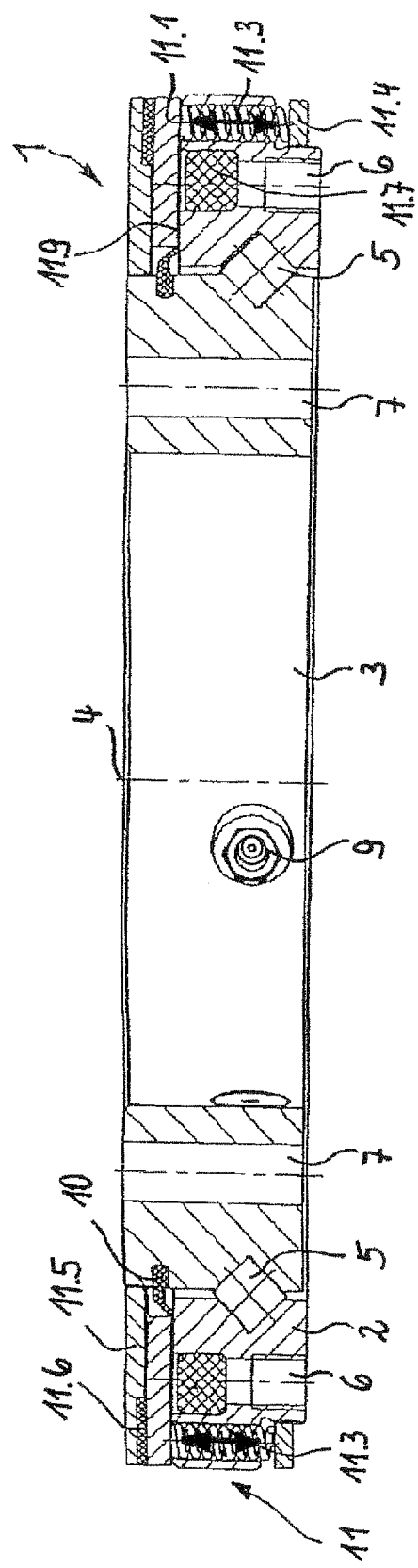
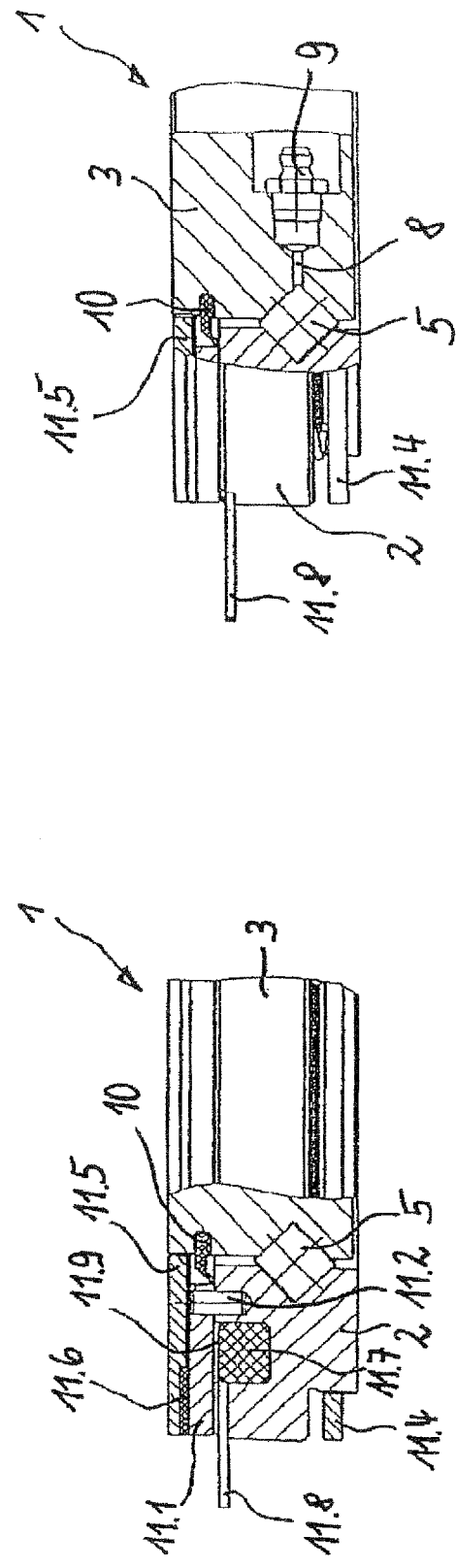

ROLLING BEARING WITH BRAKE MECHANISM

This application is a 371 of PCT/EP2008/064298 filed Oct. 22, 2008, which in turn claims the priority of DE 10 2007 057 780.1 filed Nov. 30, 2007, the priority of both applications is hereby claimed and both applications are incorporated by reference herein.

FIELD OF THE INVENTION

The invention relates to a roller bearing having a braking device, in particular a rotating connection, comprising a bearing outer ring and a bearing inner ring, between which roller bodies roll on associated raceways, wherein a braking element, which can be moved and is connected to the bearing rings, is pressed against an opposing surface, which is connected to the associated other bearing ring by a friction lock in order to produce a braking effect, and the friction lock can be cancelled with the aid of an electromagnet.

BACKGROUND OF THE INVENTION

Roller bearings with braking devices have already been known for a relatively long time. In the case of roller bearing rotating connections on wind power installations, there is a risk of them failing after a relatively short time as a result of grooves being formed in the raceways. This phenomenon is produced in particular by small pivoting movements in order to compensate for the wind direction, which results in the roller bodies sliding on the raceway. In order to prevent this wear, it is known for various measures to be adopted in order to increase the low rotation resistance in roller bearings. In this context, DE 37 25 972 A1 and DE 41 04 137 A1 propose that an additionally circumferential braking device be used. The braking force and therefore the desired rotation resistance can then be adjusted from the outside. One disadvantage in this case is that, in the first case, the braking element can be canceled only when the wind power installation is shut down. In the second case, the braking device is composed of a large number of individual mechanical parts, and is therefore complex to manufacture, and complicated to handle.

DE 19 04 954 B discloses a rotating connection without a rotating journal for mechanical diggers, cranes or the like, in order to support a superstructure, which can pivot, on a chassis. These rotating connections each comprise a single-part rotating ring and a two-part further rotating ring, which is composed of two profiled rings. The two rotating rings are each supported with respect to one another by the balls in a two-row ball bearing, and are equipped with a braking apparatus. The braking apparatuses each have one or more brake-block supports, which are attached to a component which is connected to the single-part rotating ring. This arrangement has the disadvantage that the braking apparatuses are arranged outside the actual bearing arrangement, and therefore occupy additional physical space.

A bearing arrangement of this generic type with a braking function is already known from DE 101 27 487 A1. The radial bearing arrangement shown in FIG. 1 has a grooved ball bearing, in the form of a radial bearing, and a braking device which is arranged axially alongside it. The grooved ball bearing comprises the inner ring, the outer ring and bearing balls which are arranged between the two rings in a cage. Furthermore, the grooved ball bearing has two sealing rings, which seal the annular space on both sides from the environment. The braking device has an inner holding ring and an outer holding ring. A brake disk is attached via a flat wire spring to a flange, which is directed radially outward, on the inner holding ring, with the brake disk being composed of a ferromagnetic material and having a brake lining on its side facing away from the flange. The attachment by means of the flat wire spring results in the brake disk being connected to the inner holding ring such that they cannot rotate with respect to one another, but such that it can be moved in the axial direction. An opposing surface is formed opposite the brake lining on the outer holding ring, against which the brake lining is pressed during braking. The outer holding ring furthermore has an electrical coil and one or more permanent magnets which are each arranged in the area between the brake disk and the grooved ball bearing, and are mechanically connected to the outer holding ring, and therefore also to the opposing surface.

This has the disadvantage that the braking device must be flange-connected to the bearing as an external part in the axial direction, and therefore occupies additional physical space. The holding rings are of relatively complicated design and must first be connected by pins to the bearing rings in a complex manner. A further disadvantage results from the fact that the braking effect is initiated by a permanent magnet, which attracts the brake disk. In certain applications, however, a continuous magnetic field is disadvantageous since, in some circumstances, dirt containing iron is attracted from the bearing.

SUMMARY OF THE INVENTION

The invention is therefore based on the object of avoiding said disadvantages and of providing a braking apparatus which can be manufactured easily, occupies a minimum amount of physical space, and provides a braking force which is matched to the respective application.

According to the invention, this object is achieved in that the braking element is arranged as an integral bearing component within one of the bearing rings and is pressed by means of spring force against the opposing surface, wherein the spring force is variably adjustable and the electromagnet comprises one of the bearing rings as a soft-iron core, and a coil surrounding this.

This results in a bearing arrangement with the braking device in which the braking device requires virtually no additional physical space, since it is an integral component of the bearing. The accommodation of the braking element in one of the bearing rings, normally in the rotating bearing ring, makes it possible to design the roller bearing with a braking device in a space-saving manner. A further advantage is that, because the braking device is arranged as an integral roller bearing component, it need not be connected in an additional and complex manner to the actual bearing arrangement.

In addition, the use of the electromagnet makes it possible to remove the braking force without any problems, thus allowing the roller bearing to move freely in this case. A roller bearing of this generic type designed in this way with a braking device can be used particularly advantageously whenever a friction moment is desired at all times, but this friction moment must also be released very quickly in certain circumstances. This is the case, for example, in the medical field, when the roller bearing arrangement is used in a rotating connection, for example in a ceiling stand, which is connected to various forms of medical equipment. In this case, it is advantageous that the friction moment that is present all the time on the one hand prevents undesirable rotation of the rotating connection, but on the other hand the rotating connection can easily be adjusted by releasing the braking device. In an emergency, when an immediate rotation of the two rings with respect to one another is required, this must also be possible when the braking device is acting. In this case, the braking force can advantageously be adjusted such that the two bearing rings can still be rotated with respect to one another by human muscle power.

A further major advantage of the invention is that it provides an integrated, adjustable braking concept which can be individually adapted by the end customer during assembly of the bearing arrangement. Since, after assembly of the braking unit, influencing the friction pairing is as impossible as influencing the number of compression springs, the present invention is based on the adjustability of the spring length, since this is proportional to the spring force, via the spring constant. Springs with the same geometric dimensions can therefore be used for many applications, but their spring force can be adjusted virtually as desired. As is known, the spring force acts on the friction lining and thus defines the holding moment of the bearing arrangement. In other words, the holding moment is predetermined, initially in a fixed form, by the number of the springs and their geometry, but can be varied by the position of the adjusting ring.

According to a further embodiment, the braking element comprises a ferromagnetic armature plate, a pressure plate and a coil which is arranged in one of the bearing rings wherein a brake lining is arranged between the armature plate and the pressure plate, the armature plate which is connected to one of the bearing rings, is held, such that it can move axially, via a plurality of guide pins which are spaced apart from one another in the circumferential direction, and a variable prestress can be applied to it via a plurality of spring elements which are spaced apart from one another in the circumferential direction, such that the spring elements are supported on an annular adjusting ring, which can move freely in the axial direction.

One important fact in this case is the uniform variation of the spring prestressing in order to prevent one-sided overloading, in the form of the pressure per unit area of the friction lining being exceeded. This is achieved by the annular adjusting ring, which is arranged on one of the bearing rings such that it can move and can therefore act axially on the spring ends, as a result of which their length and therefore their spring force is variable.

In another embodiment, the adjusting ring is held via a thread by an associated thread on one of the bearing rings and that the pressure plate is held via a thread by an associated thread on one of the bearing rings.

These two measures make it possible in a simple manner to very precisely adjust the air gap of the electromagnet in order to release the braking force. If the air gap is set to be too narrow, there is a risk of the braking effect not being released since the brake lining is not lifted off. In contrast, if the air gap is too wide, then the magnetic field is attenuated and the electromagnet must be made unnecessarily large. On the other hand, the length of the springs and therefore the desired prestressing can be influenced continuously variably by the movement of the adjusting ring.

In addition, according to a further additional feature of the invention, it has been found to be advantageous for the adjusting ring to be secured against inadvertent release by adhesive bonding, locknuts or pins. After the adjusting process, it therefore cannot rotate, thus preventing any undesirable change in the braking force.

Another additional feature provides that the roller bodies are in the form of cross-rollers, whose rollers roll with an approximately square cross section, with alternately offset axes, on raceways. The advantage of this arrangement is, in particular, that the alternately arranged roller bodies roll on the raceways in an X-arrangement, as a result of which loads can be absorbed from all directions—axial, radial and tilted moment loading—by only one cross-roller bearing.

Further features provide that the braking element and the roller bodies are separated by a sealing element which is arranged in one of the bearing rings, which is preferably in the form of a sliding seal. This ensures that the braking device cannot make contact with lubricant originating from the roller bodies, which would seriously adversely influence their effect.

According to a further feature of the invention, one of the bearing rings is intended to be provided at least one circumferential point with a radially running lubricant through-hole. This results in the roller bearing arrangement having a particularly free movement behavior, as a result of the roller bodies and their raceway being effectively lubricated.

Finally, according to a last feature of the invention, the roller bearing can be used in medical appliances. A first example is ceiling stands, which have already been known for a relatively long time and are described in DE 36 27 517 A1, DE 43 06 803 A1 and DE 199 63 512 C1. The ceiling stand described in the last prior publication is also provided with a braking device, which comprises two braking rings which radially surround the bearing arrangement on the outside. In this case as well, the braking device is illustrated as a component which has to be additionally manufactured and has to be arranged outside the actual bearing, which once again involves the disadvantages described for the prior art. A second example is patient couches or patient tables, which can assume different orientations in the circumferential direction, for medical examinations, by rotating the table plate about a vertical axis. To do this, it is necessary for the tables to be supported securely, but such that they can move, at one end via a rotating connection, since the other end oscillates more or less freely in the circumferential direction during rotation, that is to say it is not supported.

Further features of the invention will become evident from the following description and from the drawings, which illustrate one exemplary embodiment of the invention in a simplified form.

BRIEF DESCRIPTION OF THE DRAWINGS

In the figures:
FIG. 2 shows a longitudinal section along the lines II-II in FIG. 1;
FIG. 3 shows a partial longitudinal section along the line in FIG. 1;
and
FIG. 4 shows a partial longitudinal section along the line IV-IV in FIG. 1.

DETAILED DESCRIPTION OF THE DRAWINGS

Figure 1:
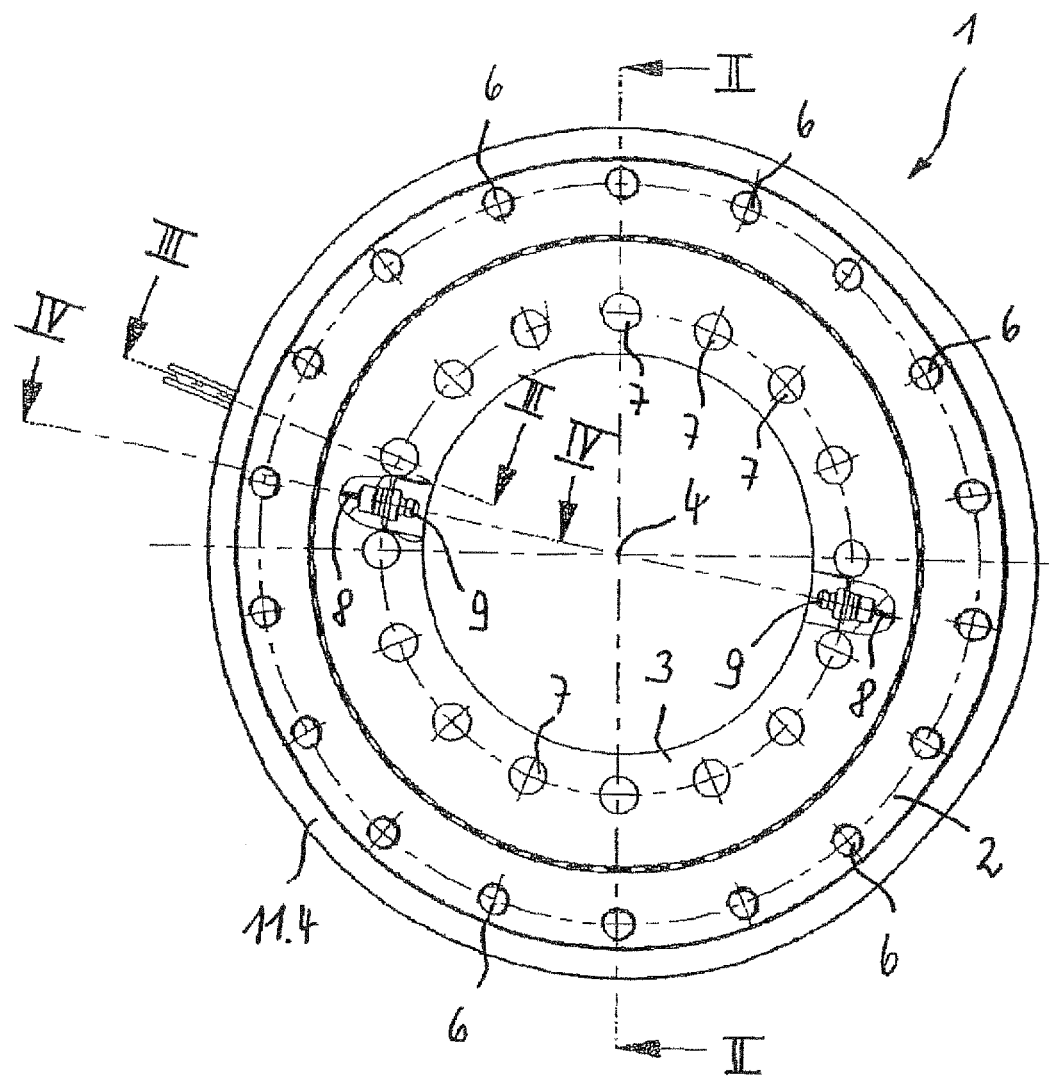
FIG. 1 shows a side view of a roller bearing according to the invention.

The roller bearing 1, designed according to the invention and as shown in FIGS. 1 to 4, comprises the bearing outer ring 2 and the bearing inner ring 3, which are arranged one inside the other concentrically around the bearing axis 4. Roller bodies 5 in the form of cross-rollers are accommodated in the annular space, which is not indicated in any more detail but is formed between the two, and their rollers roll with an approximately square cross section, with an alternately offset axis, on raceways which are not shown. The two bearing rings 2, 3 have attachment holes 6, 7 for connection to connecting structures which are not illustrated. As can also be seen, the bearing inner ring 3 is provided at two opposite circumferential points with in each case one radially running lubricant through-hole 8, which opens into the annular space which accommodates the roller bodies 5, and is closed at the other end by a lubricating nipple 9 in each case. The bearing inner ring 3 and the bearing outer ring 2 are connected in the upper area by a sealing element 10, which is fixed in a recess, which is not shown, in the bearing inner ring 3, and is designed such that it can slide.

The braking element 11 according to the invention comprises the ferromagnetic armature plate 11.1, which is annular and is held such that it can move axially in the bearing outer ring 2 by means of a plurality of guide pins 11.2, which are spaced apart from one another in the circumferential direction, as shown in FIG. 3. The guide pins 11.2 engage in holes in the armature plate 11.1, which are not shown in any more detail, and the diameter of these holes is somewhat greater than the diameter of the guide pins 11.2. As can be seen from FIG. 2, the spring elements 11.3 apply an axial force to the armature plate 11.1 at a plurality of circumferential points, which are uniformly spaced apart from one another, on one end face. The spring elements 11.3 are accommodated in a hole, which is not designated, in the bearing outer ring 2 and are supported on the annular adjusting ring 11.4 at the end opposite the armature plate 11.1. The adjusting ring 11.4 is held by its internal thread, which is not provided with a reference symbol, on the bearing outer ring 2 via its external thread, which is likewise not shown, such that it can move in the axial direction. The braking element 11 also includes the pressure plate 11.5, which is likewise annular and is held via its internal thread which is not shown, on the bearing inner ring 3, via its external thread, which is not shown. The brake lining 11.6 is arranged between the pressure plate 11.5 and the armature plate 11.1, and in the exemplary embodiment is firmly connected to the pressure plate 11.5. As can also be seen, the bearing outer ring 2 is provided with a recess, which is not annotated, but in which the coil 11.7 is arranged, and this coil 11.7 is provided with the supply line 11.8.

When no current is flowing through the coil 11.7, the bearing arrangement is braked, that is to say the bearing outer ring 2 and the bearing inner ring 3 are connected to one another with a friction lock, since the armature plate 11.1, which is connected to the bearing outer ring 2, is pressed via the brake lining 11.6 via the spring elements 11.3 against the pressure plate 11.5, which is in turn firmly connected to the bearing inner ring 3. When current is introduced via the supply line 11.8 into the coil 11.7, the resultant magnetic field moves the armature plate 11.1 in the direction of the bearing outer ring 2, as a result of which it rests firmly on the bearing outer ring 2, and the air gap 11.9, which is otherwise formed between the armature plate 11.1 and the bearing outer ring 2 when no current is flowing, disappears. As can be seen in particular from FIGS. 2 and 2a, when no current is flowing through the coil 11.7, the air gap 11.9 can be adjusted very precisely by means of the pressure plate 11.5 by changing the axial position of the latter by rotating it with respect to the bearing inner ring 3. As can also be seen, the capability to adjust the length of the spring elements 11.3 makes it possible to influence them, since they are compressed to a greater or lesser extent by rotating the position of the adjusting ring 11.4 with respect to the bearing outer ring 2. As is illustrated by the arrows shown in the spring elements 11.3, their extension or compression in the axial direction can be varied via a thread on the adjusting ring 11.4. In this case, the spring length is related via the spring constant to the spring force, with the spring force being increased when the spring elements are shortened axially.

REFERENCE SYMBOLS

1 Roller bearing
2 Bearing outer ring
3 Bearing inner ring
4 Bearing axis
5 Roller body
6 Attachment hole
7 Attachment hole
8 Lubricant through-hole
9 Lubricating nipple
10 Sealing element
11 Braking element
   Armature plate
   Guide pin
   Spring element
   Adjusting ring
   Pressure plate
   Brake lining
   Coil
   Supply line
   Air gap

The invention claimed is:

1. A roller bearing having a braking device, comprising:
   a bearing outer ring and a bearing inner ring, between which roller bodies roll on associated raceways,
   wherein a braking element, which can be moved and is connected to one of the bearing rings, is pressed against an opposing surface, which is connected to the associated other bearing ring by a friction lock in order to produce a braking effect, and the friction lock can be cancelled with an aid of an electromagnet,
   wherein the braking element is arranged as an integral bearing component within one of the bearing rings and is pressed by means of spring force against the opposing surface,
   wherein the spring force is variably adjustable and the electromagnet comprises one of the bearing rings as a soft-iron core, and a coil surrounding this, and
   wherein the braking element comprises a ferromagnetic armature plate, a pressure plate and a coil which is arranged in one of the bearing rings, and wherein a brake lining is arranged between the armature plate and the pressure plate, the armature plate which is connected to one of the bearing rings, is held, such that the armature plate can move axially, via a plurality of guide pins which are spaced apart from one another in a circumferential direction, and a variable prestress can be applied to the armature plate via a plurality of spring elements, which are spaced apart from one another in the circumferential direction, such that the spring elements are supported on an annular adjusting ring, which can move freely in an axial direction.

2. The roller bearing of claim 1, wherein the roller bearing can be used in medical appliances.

3. The roller bearing of claim 1, wherein the adjusting ring is held via a thread by an associated thread on one of the bearing rings.

4. The roller bearing of claim 1, wherein the pressure plate is held via a thread by an associated thread on one of the bearing rings.

5. The roller bearing of claim 3, wherein the adjusting ring is secured against inadvertent release by adhesive bonding, locknuts or pins.

6. The roller bearing of claim 1, wherein the roller bodies are cross-rollers, whose rollers roll with an approximately square cross-section, with alternately offset axes, on the raceways.

7. The roller bearing of claim 1, wherein the braking element and the roller bodies are separated by a sealing element which is arranged in one of the bearing rings.

8. The roller bearing of claim 7, wherein the sealing element is a sliding seal.

9. The roller bearing of claim 1, wherein one of the bearing rings is provided at least one circumferential point with a radially running lubricant through-hole.

* * * * *

UNITED STATES PATENT AND TRADEMARK OFFICE
CERTIFICATE OF CORRECTION

PATENT NO. : 8,479,893 B2
APPLICATION NO. : 12/745445
DATED : July 9, 2013
INVENTOR(S) : Nuissl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this
Eighth Day of September, 2015

Michelle K. Lee
*Director of the United States Patent and Trademark Office*